United States Patent [19]

Drott et al.

[11] Patent Number: 5,309,361
[45] Date of Patent: May 3, 1994

[54] PEDAL ASSEMBLY FOR AN AUTOMOTIVE VEHICLES

[76] Inventors: Peter Drott, Am Kunzengarten 43, 6230 Frankfurt/M 80; Peter Lohberg, Am Ringelsberg 7, 6382 Friedrichsdorf, both of Fed. Rep. of Germany

[21] Appl. No.: 857,913
[22] PCT Filed: Sep. 13, 1991
[86] PCT No.: PCT/EP91/01745
 § 371 Date: May 15, 1992
 § 102(e) Date: May 15, 1992
[87] PCT Pub. No.: WO92/05482
 PCT Pub. Date: Apr. 2, 1992

[30] Foreign Application Priority Data

Sep. 15, 1990 [DE] Fed. Rep. of Germany ....... 4029334

[51] Int. Cl.$^5$ .............. G06F 15/50; G06G 7/70; F16D 21/04
[52] U.S. Cl. .............. 364/424.1; 364/483; 192/0.052; 192/0.08; 123/399
[58] Field of Search ............... 364/424.1, 483; 74/512, 74/513; 123/399, 492, 197; 192/0.08, 0.052

[56] References Cited

U.S. PATENT DOCUMENTS

| | | | |
|---|---|---|---|
| 3,804,405 | 4/1974 | Giddings | 272/66 |
| 4,103,653 | 8/1978 | Ueno et al. | 125/117 |
| 4,458,651 | 7/1984 | Inue et al. | 123/492 |
| 4,480,611 | 11/1984 | Wendt | 123/197 |
| 4,651,311 | 3/1987 | Owen et al. | 367/147 |
| 4,861,054 | 8/1989 | Spital | 280/221 |
| 4,958,607 | 9/1990 | Lundberg | 123/399 |
| 4,996,646 | 2/1991 | Farrington | 364/483 |
| 5,002,166 | 3/1991 | Leigh-Monstevens et al. | 192/0.08 |
| 5,020,621 | 6/1991 | Martin | 180/181 |
| 5,063,811 | 11/1991 | Smith et al. | 74/513 |
| 5,086,663 | 2/1992 | Asano et al. | 74/512 |
| 5,096,574 | 3/1992 | Birdsong et al. | 210/90 |
| 5,134,952 | 8/1992 | Doolittle | 114/39.2 |

*Primary Examiner*—Thomas G. Black
*Assistant Examiner*—Jacques H. Louis-Jacques
*Attorney, Agent, or Firm*—Robert P. Seitter; J. Gordon Lewis

[57] ABSTRACT

The present invention relates to a pedal assembly (1), useful in automotive vehicles includes an accelerator pedal (6), a brake pedal (7) and a clutch pedal (8), each of the three pedals (6, 7 and 8) actuating an associated, electronically controlled device (potentiometer 9, 10; switch 11), the said pedal assembly (1) being pre-assembled and being connectible via electric connections with an energy supply unit (2) and a data bus (4).

The present invention affords a pedal assembly (1) which lends itself to ease of mounting and manages without splashboard apertures in the pedal area. Further, this pedal assembly (1) satisfies the demands of modern industrial production such as modular type of construction or just-in-time supplies.

25 Claims, 5 Drawing Sheets

PEDAL ASSEMBLY FOR AN AUTOMOTIVE VEHICLES

The present invention relates to a pedal assembly for automotive vehicles. Such pedal assemblies are generally known as they are installed e.g. in all automotive vehicles nowadays. Usually they are composed of two or three pedals for accelerating, braking and coupling, there being no need for the latter in cars with automatic transmission. The state-of-the-art pedals are coupled to a generating cylinder by means of lever assemblies for instance. Partly, the pedal positions are also converted into electronic signals, for instance as regards the accelerator pedal of a vehicle with a fuel-injection engine.

The customary pedals are mounted individually into the automotive vehicle which is expensive and time-consuming. Besides, hydraulic lines must be fitted to extend through the entire vehicle. Further, the splashboard isolating the engine compartment from the passenger cabin must be penetrated several times.

Therefore, the present invention is based on the object to provide a pedal assembly which lends itself to ease of mounting and which manages without apertures in the splashboard in the pedal area. Further, the pedal assembly according to this invention is desired to conform to the demands of modern industrial production such as modular type of construction or just-in-time supplies and to permit an intelligent processing of the arising signals.

This object is achieved by the features set forth in the main claim. Of course the subject matter of this invention can be used also on automotive vehicles with automatic transmission and, in this event, requires only an accelerator pedal and a brake pedal.

Figure 1:
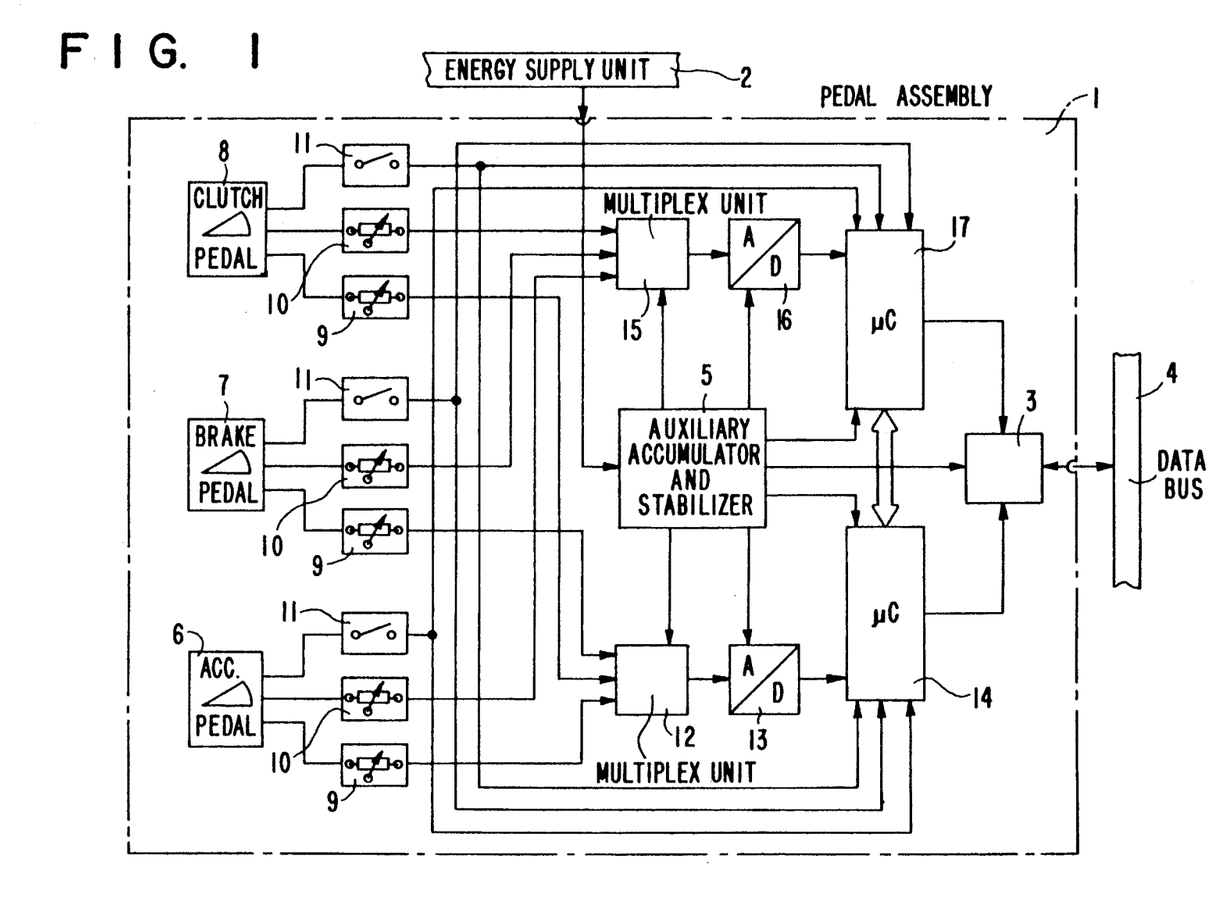
FIG. 1 is a schematic view of the data-processing stage of the pedal assembly.

The data-processing stage can be of redundant design for safety reasons. It processes the signals produced by means of the pedals and renders them appropriate for a data bus. The structure of a possible data-processing stage is illustrated in FIG. 1 and will be described in more detail in connection with the description of the Figures.

When the signal processing is redundant, it is particularly expedient that each pedal generates at least two pedal-position signals independently of one another.

Ease of assembly of the resent invention can be enhanced by the application of the features to be gathered from claim 2.

According to another improvement of this invention, each pedal produces two signals representative of the exact pedal position as well as another signal indicating that a threshold value is exceeded. That is to say, once the two first signals differ from one another—due to an error in the system—it is possible by virtue of the additional threshold value signal to decide whether a pedal is applied or which one of the two first signal generators issues correct signals.

The pedal-position signals can be generated in a particular simple fashion by means of rotary potentiometers. This possibility which is described more precisely in claims 7 to 9 will be explained by way of FIGS. 3 to 5.

According to an improvement upon the present invention, at least one leaf spring cooperating with stops is provided below the foot board. This measure permits to adjust the force-travel characteristics known from conventional pedals also on the pedal assembly according to this invention. Without these stops the linear force-travel characteristic curve is obtained which is usual with springs.

Each pedal becomes particularly comfortable when an adjustable support is provided in the heel area. In order to be able to adapt the pedal assembly to the foot inclination which varies depending on the driver's height, another improvement arranges for the pedal inclination to be adjustable.

Favourably, the adjustment mechanisms are electrically operable since the pedal assembly is scarcely accessible beneath the steering wheel and the instruments panel for a mechanic direct adjustment. If the vehicle is equipped with a seat-memory function, the adjustment mechanisms can be combined with it as well.

Possible embodiments of this invention will be explained in the following by way of the accompanying drawings. In the drawings, FIG. 2a is a front view of one arrangement of the pedals of the pedal assembly, FIG. 2b is a side view of the arrangement shown in FIG. 2a.

FIG. 4 is a cross-section of the pedal of FIG. 2a,

In FIG. 1 the rectangle in phantom lines symbolizes the pedal assembly 1 which is connected with an energy supply unit 2 and, via the intersection 3, also with a data bus 4 of the vehicle. The lines within the pedal assembly 1 are not referred to in detail, the data flow is in each case illustrated by the direction of arrows.

A line leads to the unit 5 from the extraneous energy supply unit 2 which, conventionally, is formed by the accumulator of the automotive vehicle. Said unit 5 comprises an auxiliary accumulator as well as a stabilizer and furnishes all other construction elements with the necessary energy. The auxiliary accumulator ensures that the pedal assembly 1 is able to deliver a warning to the driver even after failure of the energy supply unit 2, and in that the driver still has the time to bring the vehicle to a halt.

The pedal assembly 1 includes an accelerator pedal 6, a brake pedal 7 and a clutch pedal 8. Each of the pedals 6, 7, 8 operates two potentiometers 9 and 10 as well as a switch 11. Said switch 11 is actuated as soon as the corresponding pedal 6, 7 or 8 exceeds a specific threshold value of inclination. The signals of the potentiometers 9 are supplied via the multiplex unit 12 and the analog/digital converter 13 to the microprocessor 14 which is also furnished with the signals of all switches 11. The signals of the potentiometers 10 are supplied via the multiplex unit 15 and the analog/digital converter 16 to the microprocessor 17 which likewise is furnished with the signals of all switches 11.

Data exchange takes place between the two microprocessors 14 and 17 and allows to check whether any one of the two data-processing branches is defective. Owing to the redundant design of the pedal assembly 1, errors are detected before the information of the microprocessors 14 and 17 is issued via the intersection 3 to the data bus 4. It can be determined by means of the switch signals also supplied to the microprocessors 14 and 17 in which one of the data branches the error will be probably found.

Figures 2, 2A, 2B:
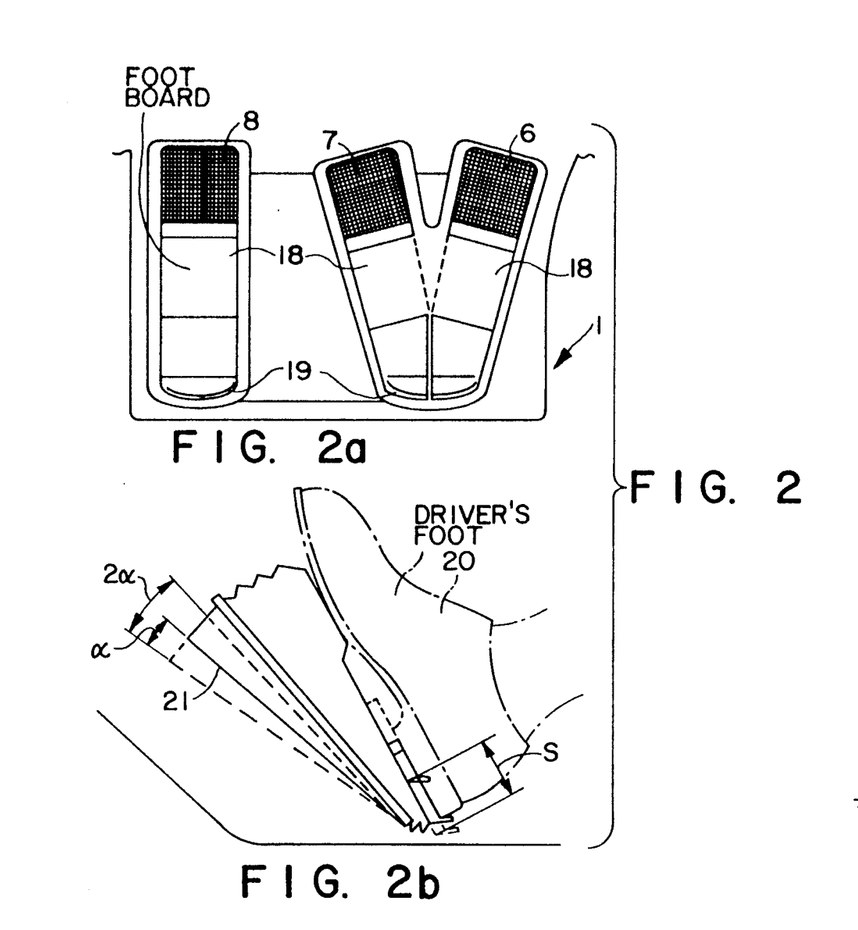

FIG. 2a illustrates the pedal assembly 1 from the front while FIG. 2b shows the side of it. All three pedals 6, 7 and 8 are designed as foot board 18. Since accelerator pedal 6 and brake pedal 7 both are operated by the right driver foot, they are placed close to one another and have one joint heel support 19. Hence the driver is required to only turn his foot when moving from the accelerator pedal to the brake pedal or vice-versa. The clutch pedal 8, too, is equipped with a support 19 for the heel.

One of the pedals 6, 7 or 8 is shown from the side in FIG. 2b. The foot 20 of the driver is placed on the pedal 6, 7 or 8. It can be seen that the support 19 is adjustable by the amount s, and the inclination of the foot board 18 is adjustable from the mid-position 21 into every direction by the angle $\alpha$. That is to say, the inclination is adjustable in total by the total angle $2\alpha$. The pedal assembly 1 can be adapted to the height of the driver owing to these possibilities of adjustment. The final positions of the adjustment zones are indicated in dot-dash lines in each case.

Figure 3:
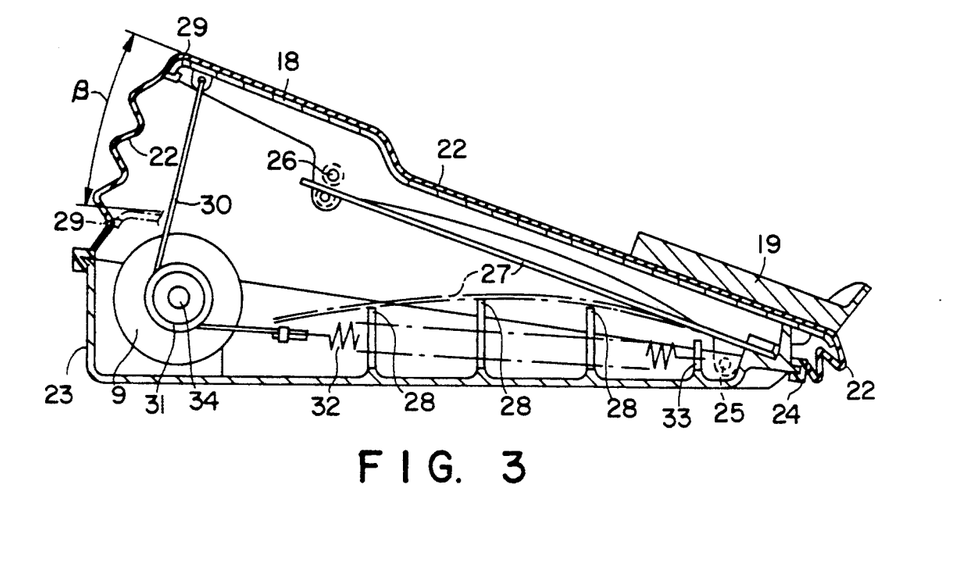
FIG. 3 is a cross-section of the pedal of FIG. 2b.

FIG. 3 shows a cross-sectional side view of the pedal 6, 7 or 8. The foot board 18 with the support 19 is coated by the pleated bellows 22 which also connects it with the housing 23 of the pedal assembly 1. The foot board 18 bears against the abutment 24 on the housing 23 and is rotatably coupled to the housing 23 at the attachment 25. Besides, a leaf spring 27 having a variable hysteresis is articulated at the point of articulation 26 of the foot board 18, the other end of which spring is clamped in on the housing 23. The leaf spring 27 cooperates with housing stops 28, the position of which permits to adjust the force-travel characteristics of the pedal.

A traction rope 30 is secured on the free end 29 of the foot board 18 and runs over a pulley 31 and is held tight by a tension spring 32. Said tension spring 32 is hooked on a projection 33 of the housing 23. The length of the rope 30 and, respectively, the angle zone $\beta$ by which the pedal can be depressed is dimensioned such that the pulley 31 performs just about one rotation with full pedal travel. The pulley 31 is arranged on the same axis 34 like the potentiometer 9. By depression of the foot board 18 the pulley 31 is moved to rotate via the tensioned rope 30 and simultaneously turns the rotary potentiometer 9 which thus generates a signal corresponding to the pedal position. The free end 29 of the foot board 18 as well as the leaf spring 27 are each drawn in phantom lines also for the depressed position.

Figure 4:
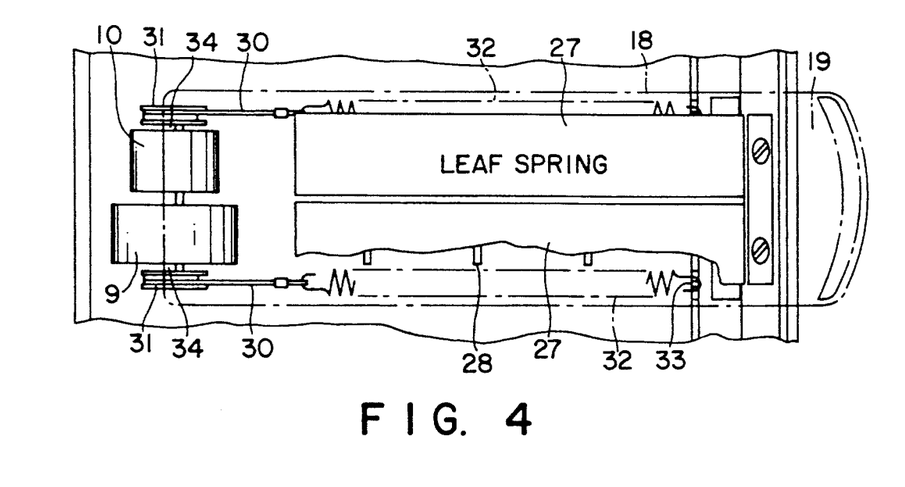

In FIG. 4 the same pedal 6, 7 or 8 like in FIG. 3 is shown, however from the top, with the foot board 18 being drawn only in dot-dash lines and being quasi transparent. All parts are provided with the same reference numerals like hereinabove. The redundant design can be seen, that means all important parts are provided twice and operate independently of one another. The two potentiometers 9 and 10 are drawn to be of different size which symbolizes their different structure and is meant to avoid that, e.g. due to aging, both potentiometers 9 and 10 differ from the nominal value to the same extent. In the event of differing deviations due to a different type of structure they can be any time calibrated mathematically anew by way of the microprocessors (FIG. 1).

Figure 5:
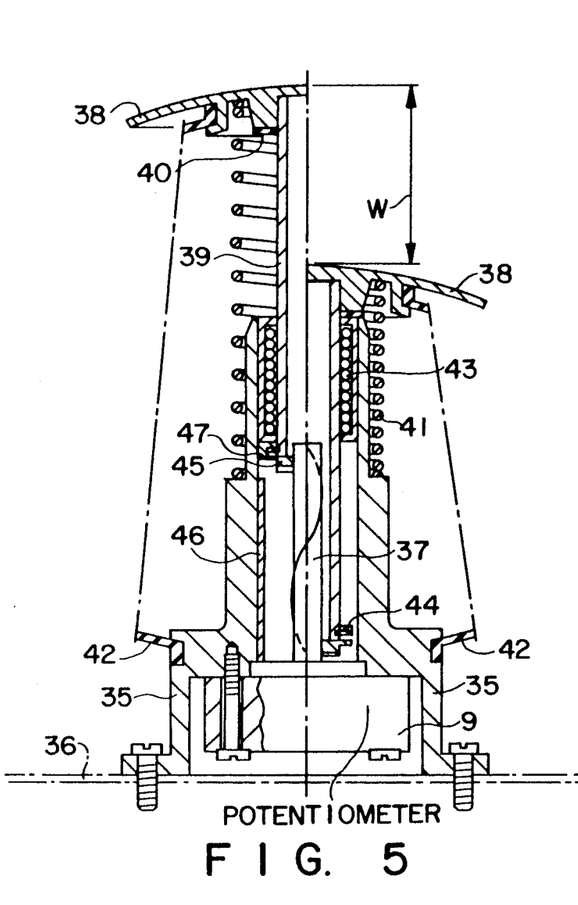
FIG. 5 is a cross-section of another pedal design.

FIG. 5 shows another pedal variant which represents some sort of a button and, when actuated, imparts a similar feeling like mechanic suspended pedals. The housing 35 is screwed to a base plate 36 of the pedal assembly 1. The potentiometer 9 which is designed as a rotary potentiometer is likewise screwed to the housing 35. Said potentiometer is operated by a screwed rod 37 which has a winding and, on depression of the cap 38, is moved to rotate by the guide tube 39 coupled with the cap. A bumper 40 is provided on the cap 38 and moves to abut on housing 35 after the full pedal travel w. Further disposed between the housing 35 and the cap 38 are the resetting spring 41 and the pleated bellows 42 sheathing the pedal towards the outside.

The guide tube 39 is guided in the housing 35 by means of a spherical sleeve 43 almost devoid of losses due to friction, it is equipped with a second bumper 44 for abutment on the spherical sleeve 43 in the inactive position and, via the cam disc 45, is in connection with the rod 37 in order to set it to rotate on actuation. This rotation is directly transformed onto the potentiometer 9.

A redundant design is likewise possible in the pedal variant shown in FIG. 5. The switch 11 shown in FIG. 1 is realized in that an electric contact 46 is designed on the housing 35 and a sliding contact 47 is designed on the guide tube 39 above the cam disc 45.

The inactive position is shown on the left, while the actuated position is shown on the right hand side in FIG. 5.

Figure 6:
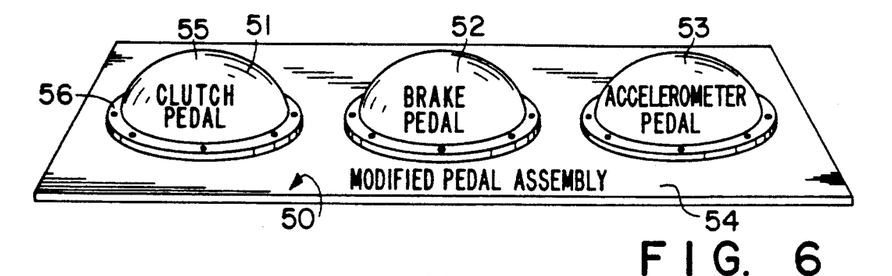
FIG. 6 is a pedal assembly with modified pedals.

FIG. 6 shows a modified pedal assembly 50 wherein a clutch pedal 51, a brake pedal 52 and an accelerator pedal are premounted on an assembly plate 54. Of course a smaller or a larger number of pedals can also be mounted on the assembly plate 54. For instance, the clutch pedal can be combined with the accelerator pedal 53, e.g. on vehicles with an automatic clutch. Further, the actuating condition of one single pedal can likewise decide on whether and in what condition the vehicle is braked or accelerated so that accelerator pedal and brake pedal can be The pedal assembly comprises as a housing an elastic cap 55 which is attached to the assembly plate 54 by way of a fastening ring 56. Said attachment can be effected, as is indicated in FIG. 6, by screwing, or by a catch-type lock, by cementing pr by any other type of fastening the fastening ring 56 or the cap 55 itself to the assembly plate 54.

One may imagine the elastic cap 55 to be a segment (calotte) of a rubber ball, it having a cavity in its interior. Simultaneously, it is ensured by appropriate forces that the elastic cap is subjected to the effect of force towards its outer surface so that it yields elastically when exposed to force applied to it from the outside. After this outside force is deleted, it will re-assume its former condition so that the temporary deformation is removed again.

FIGS. 7 to 10 show possible embodiments of the pedals 51 to 53 in a cross-sectional view.

Figure 7:
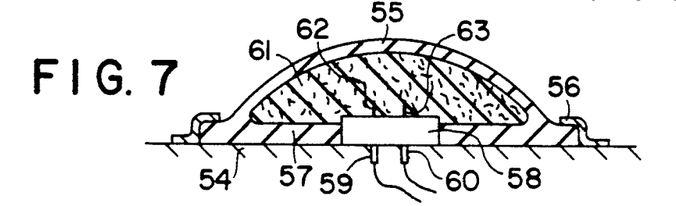
FIGS. 7 to 10 show details in respect of several pedals with different sensors and/or converters in the pedal.

In FIG. 7 the elastic cap 55 in turn is retained on the assembly plate 54 by the fastening ring 56. Associated integrally with the elastic cap 55 is a circular bottom 57, which bottom 57 can be cast, welded or made integrally by die-casting with the cap 55. A sensor 58 is arranged in an opening in the bottom 57 sealed relative to possibly escaping pressure fluid. Said sensor comprises two possibly cast-in electric connections 59, 60 which are provided with electrodes 62, 63 projecting into the interior 61 of the elastic cap 65. Said interior 61 is filled at least partly by a block of electrically conductive rubber, the electrodes 62, 63 projecting into the rubber block. The rubber is chosen such that its electric conductivity depends on the pressure it is exposed to. The electrodes 62, 63 are placed such within the rubber block which entirely or partly fills the interior 61 that the force exerted on the outer surface of the elastic cap 55 results in a maximum possible change in the electrical behaviour of the rubber. This means that under certain circumstances the two electrodes 62, 63 can be arranged spaced much farther from one another than is shown in FIG. 7.

Once the operator of an automotive vehicle applies with his/her foot a force on the outer surface of the elastic cap 55, a corresponding pressure will be applied to the interior and hence to the rubber block 61 of the pedal assembly what results in a corresponding change in the current flowing through the connections 59, 60. This change in current and hence change in resistance of the rubber block is a standard for the deformation of the cap 55 exerted by the operator and thus for the magnitude of the control quantity demanded by the operator. This way a very simple unit allows to easily control e.g. the speed of the vehicle, the intensity of the braking operation or the coupling action. It is largely indifferent at what point of the cap the operator's foot makes catch as long as the pressure exerted and hence the deformation of the cap are of a sufficient amount.

Figure 8:
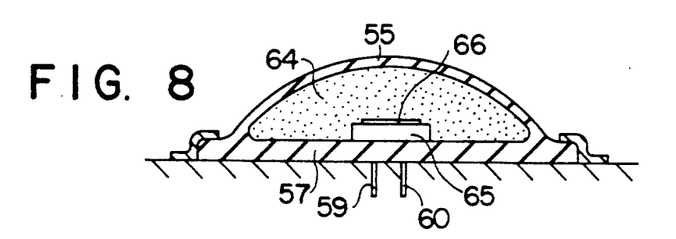

FIG. 8 describes a modified embodiment of a pedal, the reference numerals being stated only insofar as they do not refer to construction elements which have been described already in connection with FIG. 7.

In FIG. 8 the interior of the cap 55 is filled with pressure fluid 64, which pressure fluid can be a hydraulic fluid or any suitable gas. Instead of the sensor 58 a pressure transducer 65 is arranged in the interior of the cap 55 and comprises an elastic diaphragm 66. The pressure transducer 65, in turn, is provided with two electric connections 59 and 60. Said transducer is of a design such that its inner resistance allocated to the connections 59, 60 varies with the pressure exerted on the diaphragm 66. The pressure applied by the operator's foot to the cap 55 is transmitted through the pressure fluid 64 onto the diaphragm 66, a control element being caused in turn which brings about a corresponding change in current via the connections 59, 60 in dependence on the force exerted by the operator. It is not absolutely necessary though that the sensor 65 changes its resistance behaviour in consequence of the pressure variation in the pressure fluid 64. It is also possible to use a transducer which, due to the pressure applied to it, delivers a corresponding voltage to the connections 59, 60 or, respectively, changes its capacity or inductivity.

Figure 9:
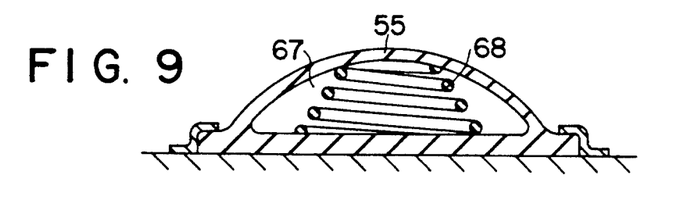

FIG. 9 shows in a simplified view another embodiment of the pedal assembly which is modified in comparison to FIGS. 8 and 9. A spiral spring is inserted into the interior 67 of the cap 55 which is to serve two purposes at the same time. On the one hand, the spiral spring 68 boosts the outwardly directed force of the interior 67 on the inner surface of the cap 55. On the other hand, the spiral spring 68 is connected—in a manner not shown—with an induction-measuring device which constantly measures the inductivity of the spiral spring 68. A deformation of the cap 55 results also in a corresponding variation of the coil distance of the spiral spring 68 and thus in a corresponding change in the inductivity of this spring. This modified induction value is measured by the non-illustrated measuring device, the measured value representing a standard for the magnitude of the control quantity desired by the operator.

Figure 10:
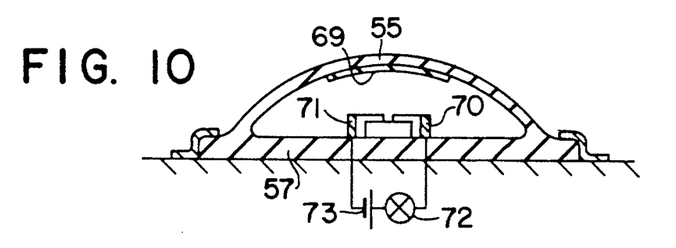

FIG. 10, in turn, shows an embodiment of the pedal assembly modified in respect of FIGS. 7, 8 and 9, an elastic contact surface 69 being secured to the inner surface of the cap 55 which may be effected by cementing, vulcanizing or spraying-on, for instance.

Figure 10A:
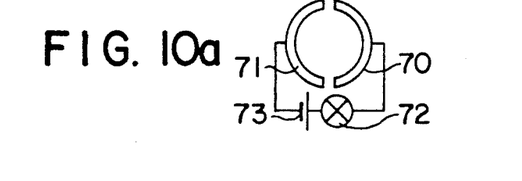

Opposite to the contact surface 69, two semi-circular electrodes 70, 71 are arranged in the bottom 57 and are shown in a top view in FIG. 10*a*. These electrodes 70, 71 are connected with an alarm apparatus which is illustrated symbolically as warning lamp 72 in FIG. 10.

Once the inner surface of the cap 55 with its contact surface 69 is moved into contact with the electrodes 70, 71, the alarm apparatus 72 will respond because of the current flow initiated e.g. by a battery 73. It can be indicated thereby for instance that the pedal assembly is no more operable because of lack in pressure fluid so that corresponding safety operations such as an automatic braking operation, disconnection of the fuel supply or the like can be performed herein owing to the response of the alarm apparatus.

The sensors and transducers illustrated in FIGS. 7 to 10 can be combined in that for instance two transducers and/or sensors of different type are incorporated in one pedal assembly thereby allowing to assess the parallel prevailing signals obtained by different transducers and, owing to their redundancy, thereby achieving an enhanced safety for the corrective signals of course the alarm contact according to FIG. 10 can also be combined with the transducers according to FIGS. 7 to 9. It is ensured by these measures that on failure of one transducer, the operator will be given an indication as to which transducer has failed, while it is simultaneously possible to continue to issue corrective signals via the parallel connected second transducer.

It is advantageously possible in all variants illustrated to integrate parts or even the entire hardware of a signal-processing electronics into the pedal assembly or, respectively, into the pedals, e.g. in the vicinity of the sensor. In FIG. 8 a printed circuit board 120 having a like electronics encompasses the sensor 65, the said electronics being protected mechanically by the cap.

Figure 11:
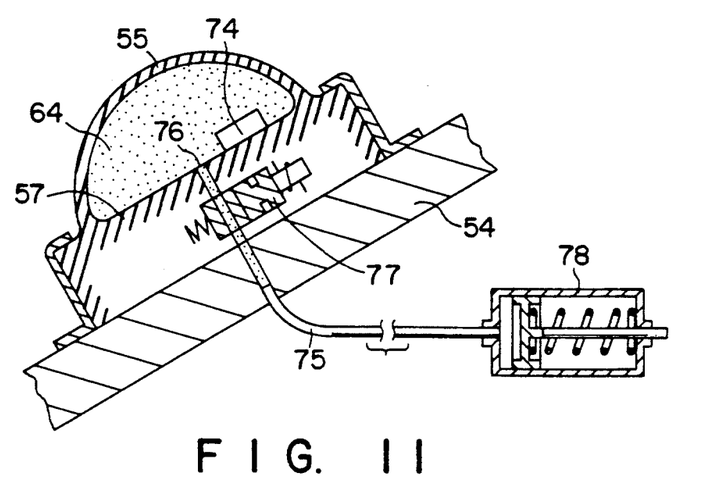
FIGS. 11 and 12 show the connection of one of the pedals according to FIGS. 7 to 10 with an emergency actuation of a brake.

In connection with FIG. 11 an emergency actuation is symbolically shown as it can be initiated by the inventive pedal assembly. Inside the cap 55 a sensor device 74 is shown symbolically which can correspond roughly to the sensor device according to FIG. 7 or 8. The bottom 5 7 of the cap is penetrated by a channel 76 which passes over into a pressure fluid line 75. The passage of channel 76 and line 75 is adapted to be magnetically closed or opened, respectively, by a two-way valve 77. Said valve 77 is operated magnetically via the sensor device 74. The sensor device may perform the functions of the transducers and, respectively, sensors according to FIGS. 7 to 9, and it may also have the switching ability of the contact devices 69, 70 according to FIG. 10. Another possibility of triggering the valve 77 by the sensor device 74 can consist in a threshold-value switch which switches the valve 77 to assume its open position illustrated in FIG. 11 once a predefined pressure value is reached. The following control possibility is obtained thereby. In the normal condition the sensor device 74, as is described with reference to FIGS. 7 to 9, issues a corrective signal responsive to the pressurization of the cap 55. If, for any reason whatsoever, a predefined pressure is exceeded or an action is initiated, as is described with reference to FIG. 10, the magnet of the valve 11 will react, and the pressure fluid of the interior of the cap 55 may propagate via the valve 77 into the line 75 from where it is able to drive a suitable generator 78. Corresponding alarm devices and auxiliary devices can be triggered by the generator 78. It thus shows that, even upon malfunction of the sensor 74 in respect of its analogous place values, a corrective function is still possible by virtue of the generator 78 through the pressure fluid contained in the interior 64. This way a corrective action can still be performed via the generator 78 even on failure of the valve 77.

If, on the other hand, the valve 77 operates in its normal condition, the valve 77 is closed and the transducer 74 can be actuated through the pressure or any other control variable within the interior 64.

Another protective function of the valve 77 resides in an emergency function upon power failure. In the normal case the valve is energized and the hydraulic effect is stopped. The system operates through the sensor 74. When the power fails, the valve will open and the pedal will operate hydraulically.

Figure 12:
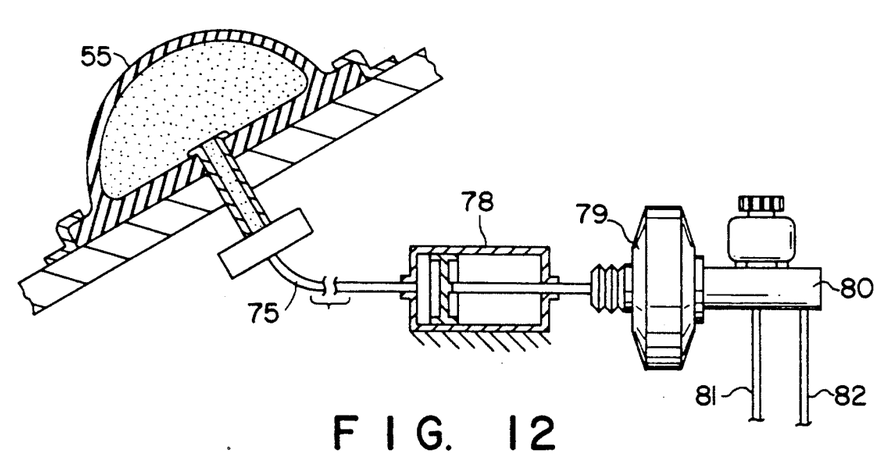

FIG. 12 shows the possibility of controlling an auxiliary-force brake system, such as a brake power booster 79, in addition to FIG. 11 or also generally via the cap 55 and a line 75 as well as a generator 78, with brake lines 81, 82 emanating from the master cylinder 80 of the booster.

The pedal assembly according to the present invention offers a great number of advantages. On the one hand, it is of a very straightforward design. on the other hand, it is possible by such pedal assemblies to permit much more complex evaluations to be effected by the electronics related to the pedal assembly than has previously been the case. For instance, it can be found out by an evaluating electronics by virtue of a defined pulsewise actuation of the elastic cap 55 that the speed value adjusted the last is to be preserved so that the vehicle speed can then be adjusted to adopt this value. Another advantage resides in the ease of exchanging the pedal assemblies so that these can be adjusted in their response behaviour to different operators in that e.g. the response behaviour of the sensors is changed electronically, it being possible to adapt the pedal in a simple fashion to the more or less susceptible behaviour of the operator and his/her forces available for the control.

We claim:

1. A pedal assembly for an automotive vehicle having an energy supply and a data bus, said pedal assembly comprising:
   at least two pedals each having a first electrical signal generator indicating pedal position, a second electrical signal generator also and independently indicating pedal position, and a third electrical signal generator indicating when the pedal exceeds a threshold inclination; and
   a data processing system for receiving electrical signals from each of said plurality of electrical signal generators and delivering electrical signals to said data bus, said data processing system having means for providing energy from said energy supply to said pedal assembly and being redundant so that it can determine the consistency of said electrical signals.

2. A pedal assembly as claimed in claim 1 wherein said data processing system comprises:
   a first data processing branch having:
   (a) a first multiplex unit receiving electrical signals from each of said first electrical signal generators,
   (b) a first analog-digital convertor receiving electrical signals from said first multiplex unit, and
   (c) a first microprocessor receiving electrical signals from said first analog-digital converter, said first microprocessor also receiving electrical signals from each of said third signal generators; and
   a second data processing branch having:
   (a) a second multiplex unit receiving electrical signals from each of said second electrical signal generators;
   (b) a second analog-digital converter receiving electrical signals from said second multiplex unit, and
   (c) a second microprocessor receiving electrical signals from said second analog-digital converter, said second microprocessor also receiving electrical signals from each of said third signal generators and exchanging data with said first microprocessor to check whether one of said first microprocessor to check whether one of said first and said second data processing branches is defective and, if so, which data processing branch is defective.

3. A pedal assembly as claimed in claim 2 wherein said data processing system further comprises an intersection for receiving electrical signals from said first and second microprocessors and delivering electrical signals to said data bus.

4. A pedal assembly as claimed in claim 1 wherein said first electrical signal generators are first potentiometers, said second electrical signal generators are second potentiometers, and said third electrical signal generators are switched.

5. A pedal assembly as claimed in claim 4 wherein said first potentiometers and said second potentiometers are rotary potentiometers, each rotary potentiometer having an axis and at least one of a travel indicator, an angle indicator, and a digital position indicator.

6. A pedal assembly as claimed in claim 5 further comprising:
   a housing;
   a plurality of tension springs attached to said housing;
   a foot board associated with each of said pedals, each foot board having a free end;
   a pulley associated with each rotary potentiometer, each said pulley arranged on the same axis as its associated rotary potentiometer; and
   a belt associated with each rotary potentiometer, each said belt secured on said free end of a foot board, engaged with said associated rotary potentiometer, and held by one of said tension springs.

7. A pedal assembly as claimed in claim 5 further comprising a screwed rod disposed between each rotary potentiometer and its associated pedal, each said screwed rod adapted to rotate upon depression of said pedal and act directly upon said rotary potentiometer.

8. A pedal assembly as claimed in claim 1 wherein said energy providing means has a stabilizer and an auxiliary accumulator ensuring that said pedal assembly can deliver a warning even upon failure of the energy supply.

9. A pedal assembly as claimed in claim 1 further comprising:
   a foot board associated with each of said pedals;

a housing having at least one stop;

at least one least spring arranged beneath each of said foot boards and clamped on said housing, each said leaf spring engaging said at least one stop for adjusting the force-travel characteristics of each of said pedals.

10. A pedal assembly as claimed in claim 1 wherein each of said pedals has an adjustable heel support.

11. A pedal assembly as claimed in claim 10 wherein said adjustable heel supports are electrically operable.

12. A pedal assembly as claimed in claim 11 wherein said automotive vehicle has an electrically operated seat-memory element and said electrically operable adjustable heel supports are electrically connected with said seat-memory element.

13. A pedal assembly as claimed in claim 1 wherein each of said pedals has a means for adjusting the inclination of said pedal.

14. A pedal assembly as claimed in claim 13 wherein said adjusting means are electrically operable.

15. A pedal assembly as claimed in claim 14 wherein said automotive vehicle has an electrically operated seat-memory element and said electrically operable adjusting means are electrically connected with said seat-memory element.

16. A pedal assembly for an automotive vehicle comprising:

an assembly plate; and at least two pedals each having:
(a) an elastic housing mounted on said assembly plate and defining an internal cavity, and
(b) a pressure sensor positioned in said internal cavity.

17. A pedal assembly as claimed in claim 16 wherein said elastic housing is a cap which, when deformed by an external force, applies an analogous force to said pressure sensor.

18. A pedal assembly as claimed in claim 17 wherein said pressure sensor is:
(a) positioned adjacent said elastic housing and at least partly fills said internal cavity defined by said housing; and
(b) a block of electrically conductive rubber having pressure-responsive current-voltage characteristics and two spaced electrodes.

19. A pedal assembly as claimed in claim 17 further comprising pressure fluid and wherein:
(a) said internal cavity defined by said elastic cap is pressure fluid tight and contain said pressure fluid, and
(b) said pressure sensor is a pressure transducer responsive to pressure variations in said pressure fluid caused by changes in the volume of said internal cavity.

20. A pedal assembly as claimed in claim 19 further comprising:

an auxiliary brake system;

an actuating member connected to said auxiliary brake system; and a pressure fluid line connected on one end to said internal cavity defined by said elastic cap and on its opposite end to said actuating member, said actuating member operating said auxiliary brake system in response to the pressure in said pressure fluid line.

21. A pedal assembly as claimed in claim 20 further comprising a valve inserted into said pressure fluid line and responsive to said pressure transducer said valve opening when said pressure transducer reaches a predetermined value.

22. A pedal assembly as claimed in claim 17 wherein said pressure sensor is a spria spring whose deformations create a measurable change in the indicitivity of said spiral spring.

23. A pedal assembly as claimed in claim 22 wherein said elastic cap has a bottom and an inner top surface and said spiral spring is a conical spiral spring having its external winding supported on said bottom of said elastic cap and its opposite winding supported on said inner top surface of said elastic cap.

24. A pedal assembly s claimed in claim 17 wherein said elastic cap has a bottom and an inner top surface and said pressure sensor has two contact electrodes disposed on said bottom of said elastic cap and a contact surface disposed on said inner top surface of said elastic cap, said contact electrodes being short-circuited when engaged by said contact surface.

25. A pedal assembly as claimed in claim 17 further comprising a fastener for mounting said elastic housing on said assembly plate, said fastener selected from the groups consisting of screws, welds, cements, clamps, and locks.

* * * * *

UNITED STATES PATENT AND TRADEMARK OFFICE
CERTIFICATE OF CORRECTION

PATENT NO. : 5,309,361
DATED : May 3, 1994
INVENTOR(S) : Peter Drott, Peter Lohberg It is certified that error appears in the above-indentified patent and that said Letters Patent is hereby corrected as shown below:

On the title page: Item [54] and Column 1, line 2, delete "VEHICLES" and substitute therefor --VEHICLE--

In claim 2, column 8, lines 24-25, delete "said first microprocessor to check whether one of"

In claim 4, column 8, line 37, delete "switched" and substitute therefor --switches--

In claim 21, column 10, line 23, after "transducer" and before "said" insert a comma (,)

In claim 22, column 10, line 27, delete "spria" and substitute therefor --spiral--

UNITED STATES PATENT AND TRADEMARK OFFICE
CERTIFICATE OF CORRECTION

PATENT NO. : 5,309,361
DATED : May 3, 1994
INVENTOR(S) : Peter Drott and Peter Lohberg It is certified that error appears in the above-indentified patent and that said Letters Patent is hereby corrected as shown below:

In claim 22, column 10, line 28, delete "indicitivity" and substitute therefore --inductivity--

In claim 24, column 10, line 36, delete "s" after "assembly" and substitute therefor --as--

In claim 25, column 10, line 46, delete "groups" and substitute therefor --group--

Signed and Sealed this

Twentieth Day of December, 1994

Attest:

BRUCE LEHMAN

Attesting Officer          Commissioner of Patents and Trademarks